United States Patent
Imai

(10) Patent No.: US 7,940,622 B2
(45) Date of Patent: May 10, 2011

(54) RECORDING/REPRODUCTION DEVICE, EVALUATION VALUE CALCULATION METHOD, AND EVALUATION VALUE CALCULATION DEVICE

(75) Inventor: Mitsugu Imai, Kanagawa (JP)

(73) Assignee: Sony NEC Optiarc Inc., Tokyo (JP)

( * ) Notice: Subject to any disclaimer, the term of this patent is extended or adjusted under 35 U.S.C. 154(b) by 270 days.

(21) Appl. No.: 12/376,974

(22) PCT Filed: Aug. 2, 2007

(86) PCT No.: PCT/JP2007/065155
§ 371 (c)(1),
(2), (4) Date: Feb. 10, 2009

(87) PCT Pub. No.: WO2008/018356
PCT Pub. Date: Feb. 14, 2008

(65) Prior Publication Data
US 2010/0188953 A1   Jul. 29, 2010

(30) Foreign Application Priority Data
Aug. 11, 2006   (JP) .................................. 2006-220030

(51) Int. Cl.
G11B 7/0045  (2006.01)
(52) U.S. Cl. .................................................. 369/53.44
(58) Field of Classification Search ............................ None
See application file for complete search history.

(56) References Cited

U.S. PATENT DOCUMENTS

| | | | |
|---|---|---|---|
| 5,938,791 A | | 8/1999 | Narahara |
| 7,355,957 B2* | | 4/2008 | Yamanaka et al. ......... 369/275.4 |
| 7,379,398 B2* | | 5/2008 | Shimamoto et al. ....... 369/44.29 |
| 7,379,408 B2* | | 5/2008 | Tatsuzawa et al. ......... 369/59.22 |
| 7,391,699 B2* | | 6/2008 | Minemura ................ 369/59.22 |
| 7,457,218 B2* | | 11/2008 | Ogawa et al. .............. 369/53.19 |
| 7,522,504 B2* | | 4/2009 | Kashihara et al. ......... 369/53.31 |
| 2003/0090980 A1 | | 5/2003 | Kashihara et al. |
| 2004/0209293 A1 | | 10/2004 | Kashihara et al. |
| 2005/0078579 A1 | | 4/2005 | Miyashita et al. |
| 2006/0203679 A1 | | 9/2006 | Kashihara et al. |

FOREIGN PATENT DOCUMENTS

| | | |
|---|---|---|
| JP | 2003 151219 | 5/2003 |
| JP | 2003 151220 | 5/2003 |
| JP | 2004 63024 | 2/2004 |
| JP | 2004 213759 | 7/2004 |
| JP | 2004 253114 | 9/2004 |
| JP | 2004 335079 | 11/2004 |
| JP | 3674160 | 5/2005 |

* cited by examiner

Primary Examiner — Mark Blouin
(74) Attorney, Agent, or Firm — Oblon, Spivak, McClelland, Maier & Neustadt, L.L.P.

(57) ABSTRACT

In a recording/reproducing system that performs PRML decoding, a suitable evaluation value for setting a recording condition can be obtained with a simple structure. It is assumed that a value corresponding to a difference between a difference metric between a maximum likelihood path for an equalized signal that is fed to maximum likelihood decoding processing and a path in a bit-advanced shift direction and a difference metric between the maximum likelihood path for the equalized signal and a path in a bit-delayed shift direction is a signal quality evaluation value dSAM. Further, the signal quality evaluation value dSAM is calculated using an equalization error value ek which is an error between an equalized signal value fed to the maximum likelihood decoding processing and an ideal equalized signal value determined from a decoded signal obtained as a result of the maximum likelihood decoding processing.

6 Claims, 6 Drawing Sheets $b''_k$ : 0,0,0,1,1,1,1,1,0,0,⋯ 3T - 5T $b_k$ : 0,0,0,0,1,1,1,1,0,0,⋯ 4T - 4T $b'_k$ : 0,0,0,0,0,1,1,1,0,0,⋯ 5T - 3T

|  | 2s | 3s | 4s | over5s |
|---|---|---|---|---|
| 2m | * | 3s2m | 4s2m | 5s2m |
| 3m | 2s3m | 3s3m | 4s3m | 5s3m |
| 4m | 2s4m | 3s4m | 4s4m | 5s4m |
| over5m | 2s5m | 3s5m | 4s5m | 5s5m |

(b)

|  | 2m | 3m | 4m | over5m |
|---|---|---|---|---|
| 2s | * | 3m2s | 4m2s | 5m2s |
| 3s | 2m3s | 3m3s | 4m3s | 5m3s |
| 4s | 2m4s | 3m4s | 4m4s | 5m4s |
| over5s | 2m5s | 3m5s | 4m5s | 5m5s |

RECORDING/REPRODUCTION DEVICE, EVALUATION VALUE CALCULATION METHOD, AND EVALUATION VALUE CALCULATION DEVICE

TECHNICAL FIELD

The present invention is directed to a recording/reproducing apparatus in a system that performs recording/reproduction using PRML decoding (Partial Response Maximum Likelihood decoding (PRML: Partial Response Maximum Likelihood)), and further relates to an evaluation value operation apparatus and an evaluation value operation method which can be used for the recording/reproducing apparatus.

In recording/reproducing apparatuses for optical recording media such as optical disks, the illumination pulse width, level, etc., of laser beams are adjusted to optimal states as recording conditions under which recording on a recording medium is performed.

The adjustment of recording conditions is performed based on an evaluation index of the quality of signals to be reproduced, where general evaluation values of reproduction signal quality are mean and variance values of the statistic of timing edge errors at zero-cross points or after binarization.

Here, recently, a scheme called partial response maximum likelihood decoding (PRML decoding) has been widely adopted as a reproduction scheme for optical disks, in which a more suitable evaluation index as an evaluation index of reproduction signal quality is demanded for a signal reproducing system using PRML decoding.

In such a situation, for example, as described in Japanese Patent No. 3674160, a technology in which a difference metric in the maximum likelihood decoding processing is used as a reproduction margin evaluation technique has been proposed, and a technique for a maximum likelihood decoding system to evaluate a signal quality after recording has been established.

In Japanese Unexamined Patent Application Publication No. 2004-335079, additionally, a technology in which an evaluation value calculated using a difference metric in the maximum likelihood decoding is fed back and used in recording conditions is proposed. In the technology described in Japanese Unexamined Patent Application Publication No. 2004-335079, however, an evaluation value based on a difference metric is not an evaluation value whose error matches a time axis, and is therefore inconvenient in view of the adjustment of recording conditions for appropriate mark edges because the error is not regarded as an edge error of a recording mark.

It is therefore an object of the present invention to, in a recording/reproducing system that performs maximum likelihood decoding processing, obtain an appropriate evaluation value as a signal quality evaluation value that can be used for, for example, the adjustment of recording conditions, etc., and implement simple evaluation value calculation.

DISCLOSURE OF INVENTION

A recording/reproducing apparatus of the present invention includes a writing/reading unit that writes and reads information represented by a mark and a space to and from a recording medium, a PRML decoding unit that performs partial response equalization processing and maximum likelihood decoding processing on a signal read from the recording medium by the writing/reading unit to obtain decoded data, and an evaluation value operation unit. This evaluation value operation unit calculates a signal quality evaluation value corresponding to a difference between a difference metric between a maximum likelihood path for an equalized signal that is fed to the maximum likelihood decoding processing through the partial response equalization processing and a path in a bit-advanced shift direction and a difference metric between the maximum likelihood path for the equalized signal and a path in a bit-delayed shift direction.

Furthermore, the evaluation value operation unit calculates the signal quality evaluation value using an equalization error value which is an error between an equalized signal value fed to the maximum likelihood decoding processing and an ideal equalized signal value determined from a decoded signal obtained as a result of the maximum likelihood decoding processing.

Furthermore, the evaluation value operation unit stores the calculated signal quality evaluation value in a distinct manner according to a decoded data pattern decoded in the maximum likelihood decoding processing.

Furthermore, control means for performing adjustment of a recording signal for a writing operation in the writing/reading unit by using the evaluation value obtained by the evaluation value operation unit is further included.

An evaluation value operation method of the present invention is an evaluation value operation method for calculating a signal quality evaluation value when information represented by a mark and a space on a recording medium is read, the signal quality evaluation value being an index of a quality of the read signal, the method including, when partial response equalization processing and maximum likelihood decoding processing are performed on a signal read from the recording medium to obtain decoded data, calculating a signal quality evaluation value corresponding to a difference between a difference metric between a maximum likelihood path for an equalized signal that is fed to the maximum likelihood decoding processing through the partial response equalization processing and a path in a bit-advanced shift direction and a difference metric between the maximum likelihood path for the equalized signal and a path in a bit-delayed shift direction.

An evaluation value operation apparatus of the present invention is an evaluation value operation apparatus for calculating a signal quality evaluation value when information represented by a mark and a space on a recording medium is read, the signal quality evaluation value being an index of a quality of the read signal, the apparatus including a calculation unit that calculates, on occasion of performing partial response equalization processing and maximum likelihood decoding processing on a signal read from the recording medium to obtain decoded data, a signal quality evaluation value corresponding to a difference between a difference metric between a maximum likelihood path for an equalized signal that is fed to the maximum likelihood decoding processing through the partial response equalization processing and a path in a bit-advanced shift direction and a difference metric between the maximum likelihood path for the equalized signal and a path in a bit-delayed shift direction.

In the present invention described above, it is assumed that a value corresponding to a difference between a difference metric between a maximum likelihood path for an equalized signal that is fed to maximum likelihood decoding processing and a path in a bit-advanced shift direction and a difference metric between the maximum likelihood path for the equalized signal and a path in a bit-delayed shift direction is a signal quality evaluation value.

The equalized signal is a reproduction signal that is subjected to partial response equalization processing and that is to be input to a maximum likelihood decoder.

The difference metric is a difference between a Euclidean distance between an equalized signal and a maximum likelihood path (most likelihood state transition path: decision path) detected for the equalized signal, and a Euclidean distance between the equalized signal and a counter-path (second most likelihood path). It is also called a SAM value.

And in the present invention, as counter-paths as referred to herein, a path in a bit-advanced shift direction and a path in a bit-delayed shift direction, in which a 1-bit shift occurs when compared with a maximum likelihood path (decision path) decided as a decoded data sequence, is considered.

And it is assumed that, as a difference metric, a difference between a Euclidean distance between the equalized signal and the maximum likelihood path, and a Euclidean distance between the equalized signal and the counter-path considered in the bit-advanced shift direction is a first difference metric. It is further assumed that a difference between a Euclidean distance between the equalized signal and the maximum likelihood path and a Euclidean distance between the equalized signal and the counter-path considered in the bit-delayed shift direction is a second difference metric. In the present invention, it is assumed that a difference between the first and second difference metrics is a signal quality evaluation value.

The signal quality evaluation value calculated by the present invention is a difference between two difference metrics that can be calculated for an equalized signal. This signal quality evaluation value is a value quantitatively representing a bit shift direction and a shift amount. Thus, a signal quality evaluation value suitable for use in, for example, the adjustment of recording conditions, etc., is obtained.

In practice, moreover, such a signal quality evaluation value can be calculated using an equalization error value which is an error between an equalized signal value fed to the maximum likelihood decoding processing and an ideal equalized signal value determined from a decoded signal obtained as a result of the maximum likelihood decoding processing, and another advantage is that this can be implemented with a simple apparatus structure.

Storing a signal quality evaluation value in a distinct manner according to a decoded data pattern decoded in the maximum likelihood decoding processing would be suitable for the evaluation, adjustment, or the like of recording conditions for each recording pattern.

BRIEF DESCRIPTION OF DRAWINGS

FIG. 7 is a diagram explaining a pattern grouping for the evaluation value operation unit of the embodiment.

BEST MODE FOR CARRYING OUT THE INVENTION

Figure 1:
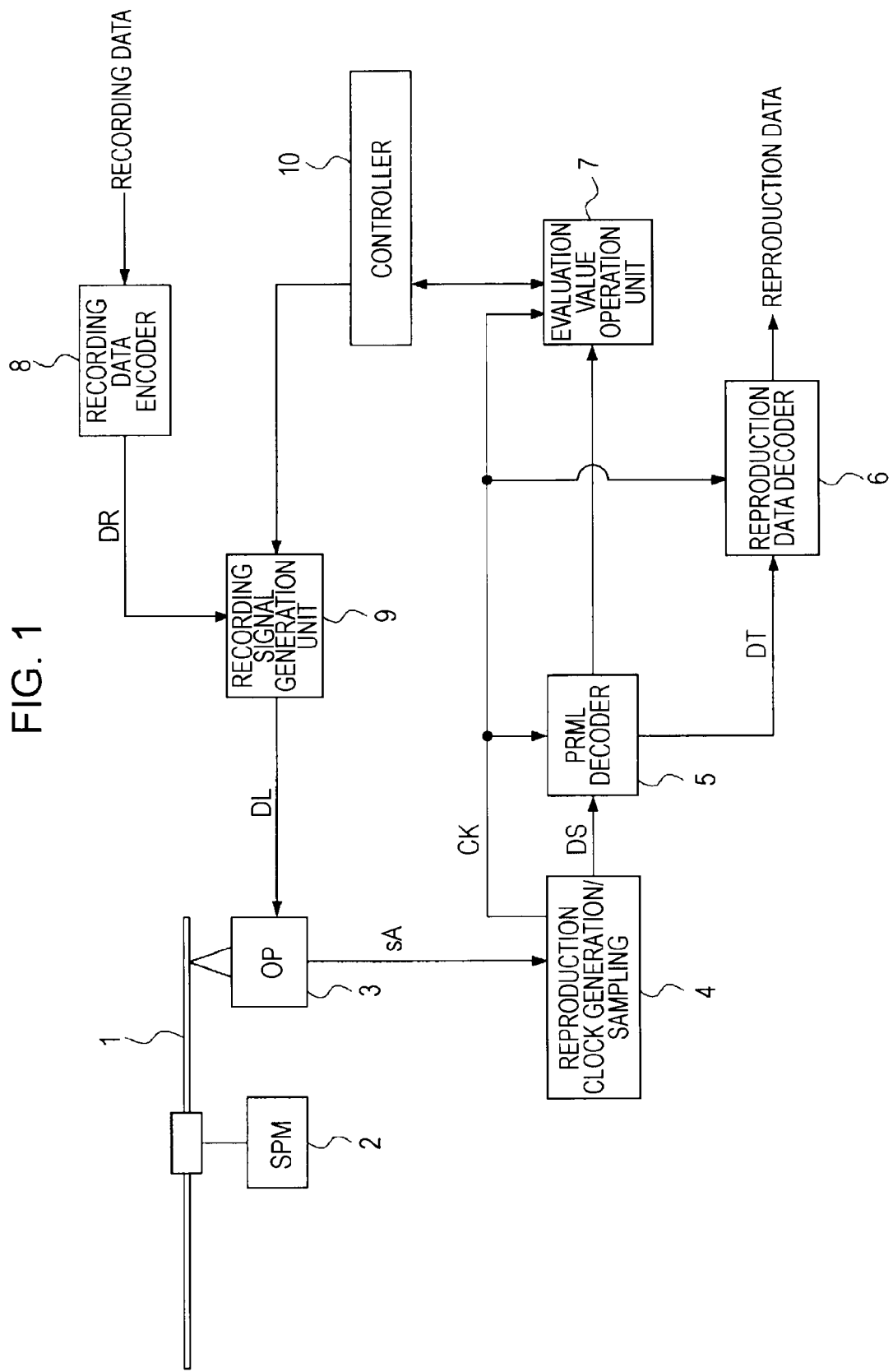
FIG. 1 is a block diagram of a main part of a recording/reproducing apparatus of an embodiment of the present invention.

An embodiment of the present invention will be explained hereinafter.

In this embodiment, by way of example, a case in which in a PRML (Partial-Response Maximum-Likelihood) scheme in which recording/reproduction is performed using a partial-response scheme and in which maximum likelihood decoding such as Viterbi decoding is performed, a partial response characteristic of PR(1, x, x, 1) is selected and a Run Length Limited code such as an RLL(1, 7) code is used with a minimum run length limited to 1 will be explained.

Incidentally, x in PR(1, x, x, 1) is selected so as to conform to optical characteristics, etc., such as "2" or "3". In the following section, for example, the case of PR(1, 2, 2, 1) will be considered.

First, the PRML decoding scheme will be briefly discussed.

The PRML decoding scheme is a scheme of detecting a partial response sequence that minimizes a Euclidean distance of a reproduction signal, and is a technology implemented by combining a process called partial response and a process called maximum likelihood detection.

Incidentally, a partial response sequence is obtained by performing a weighted addition defined by a target response on a bit sequence. In an optical disk system, PR(1, 2, 2, 1) is often used and indicates that a value obtained by assigning weights of 1, 2, 2, 1 to a bit sequence and adding the results is returned as a partial response value.

Partial response is a process of returning an output longer than 1 bit in response to a 1-bit input, wherein a process of obtaining a reproduction signal as a signal obtained by multiplying an input of consecutive 4-bit information bits by, in sequence, 1, 2, 2, and 1 and adding the results is represented as PR(1, 2, 2, 1) described above.

In addition, maximum likelihood detection is a method including defining a distance called a Euclidean distance between two signals, examining a distance between an actual signal and a signal predicted from an assumed bit sequence, and detecting a bit sequence that provides the closest distance therebetween. Incidentally, here, the Euclidean distance is a distance defined as a distance obtained by adding, over all time points, the squares of differences in amplitude between two signals at the same time point. In addition, the bit sequence that provides the closest distance between them is searched for using Viterbi detection described below.

In partial-response maximum likelihood detection combining those methods, a signal obtained from bit information on a recording medium is adjusted using a filter called an equalizer so that the signal is in a partial response process, a Euclidean distance between the resulting reproduction signal and the partial response of an assumed bit sequence is examined, and a bit sequence that provides the closest distance therebetween is detected.

An algorithm based on the Viterbi detection described previously is effective in actually searching for a bit sequence that provides a minimum Euclidean distance.

Viterbi detection is implemented using a Viterbi detector formed of a plurality of states formed of consecutive bits of a predetermined length as a unit and branches represented by transitions therebetween, and is configured to efficiently detect a desired bit sequence from among all possible bit sequences.

In an actual circuit, two registers are prepared for each state, namely, a register called a path metric register, which stores a Euclidean distance (path metric) between a partial response sequence and a signal up to the state, and a register called a path memory register, which stores a flow of a bit sequence (path memory) up to the state. Further, for each branch, an operation unit called a branch metric unit is prepared, which computes a Euclidean distance between a partial response sequence and a signal for the corresponding bit.

Figure 4:
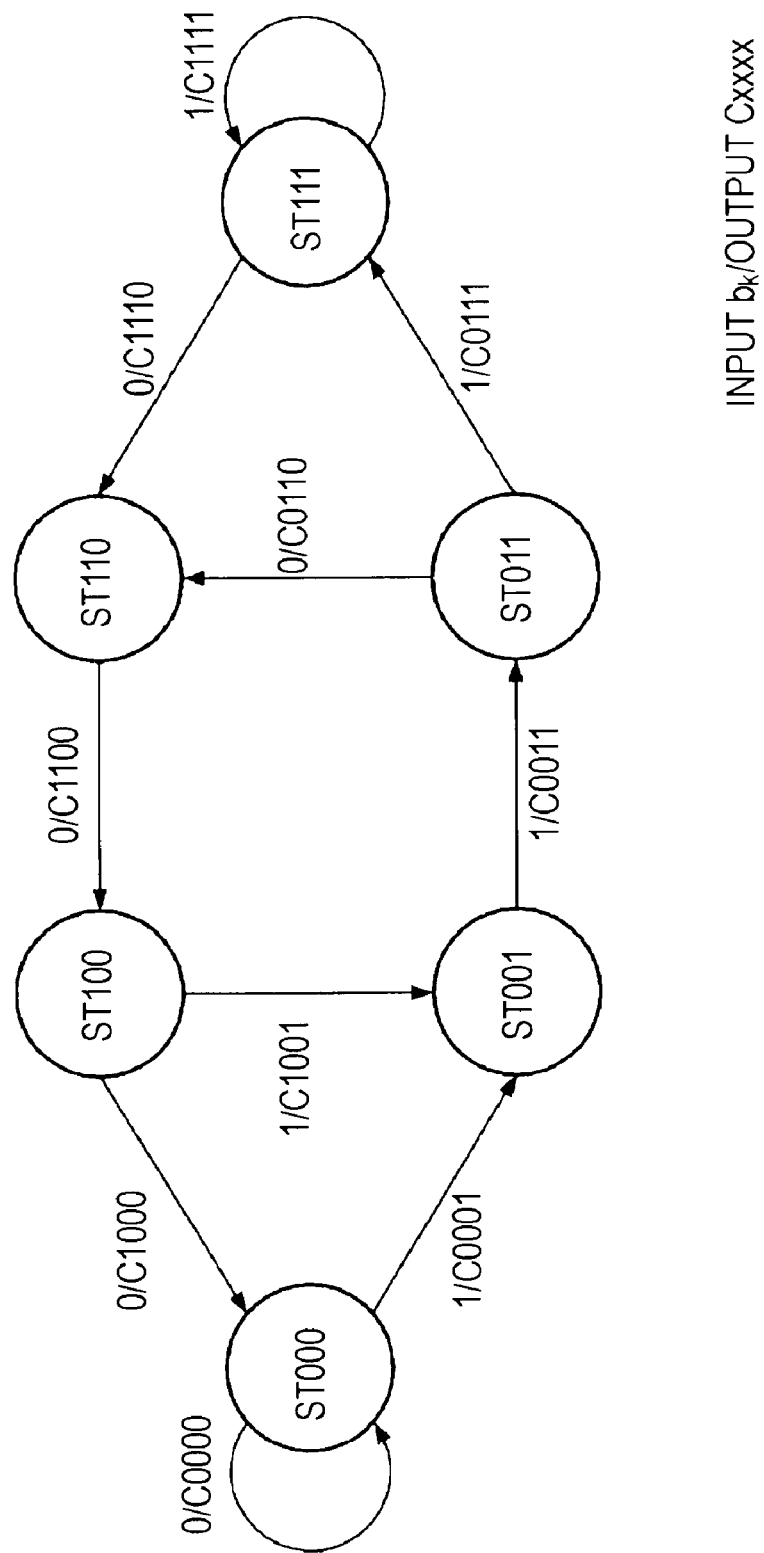
FIG. 4 is a diagram explaining state transitions in Viterbi decoding.

FIG. 4 shows state transitions (state transitions) in the case of PR(1, x, x, 1).

Letting a data bit string be bk∈{0, 1}, a PR output dk in this system has state transitions as in FIG. 4, and dk is output at a transition from each state to a next state.

In FIG. 4, ST000 to ST111 show states, and Cxxxx represents outputs.

The outputs Cxxxx represent outputs obtained at the state transitions.

Starting consideration from, for example, the state of the state ST000, if input bk=0, then the state of the state ST000 is maintained, and an output C0000 is obtained. Further, if input bk=1 in the state of the state ST000, then a transition to state ST001 occurs. An output C0001 is obtained at a transition from the state ST000 to the state ST001.

Further, starting consideration from the state ST001, the input bk can definitely be bk=1 due to the run length limitation. If input bk=1, a transition to the state ST011 occurs. An output C0011 is obtained at a transition from the state ST001 to the state ST011.

Those state transitions and output values are as follows.
C1111: ST111→ST111
C1110: ST111→ST110, C0111: ST011→ST111
C0110: ST011→ST110
C1100: ST110→ST100, C0011: ST001→ST011
C1001: ST100→ST001
C1000: ST100→ST000, C0001: ST000→ST001
C0000: ST000→ST000

Viterbi detection allows association of various bit sequences so as to be brought into one-to-one relationship by one of paths passing through the states described above. In addition, a Euclidean distance between a partial response sequence as passing through those paths and an actual signal is obtained by sequentially adding the previously-described branch metrics in the inter-state transitions forming the paths described above, that is, branches.

Furthermore, the selection of paths that minimize the Euclidean distance described above can be implemented by sequentially selecting paths having a smaller path metric while comparing the magnitudes of path metrics of two branches or less that reach in each state. Information on this selection is transferred to the path memory register so that information representing a path that reaches each state by a bit sequence is stored. The value of the path memory register finally converges, while being sequentially updated, to a bit sequence that minimizes the Euclidean distance, a result of which is output. By doing so, a bit sequence that generates a partial response sequence whose Euclidean distance is the closest to the reproduction signal can be efficiently found.

As is already known, such bit detection using PRML employs a SAM jitter as an index of the bit detection performance.

In bit detection based on PRML, if a Euclidean distance between a partial response sequence obtained from a correct bit sequence and a reproduction signal, that is, a path metric for a correct bit sequence, is smaller than a Euclidean distance between a partial response sequence obtained from an erroneous bit sequence and the reproduction signal, that is, a path metric for an erroneous bit sequence, correct bit detection is executed, and if conversely, an error occurs.

Accordingly, the performance of PRML bit detection is decided based on the magnitude of how far a difference between the former path metric and the latter path metric, that is, a difference metric, is away from 0. In other words, it can be estimated that the probability of occurrence of an error is higher for a smaller difference metric.

In addition, the most significant sequence among erroneous bit sequences, which occupies the majority of errors, is a bit sequence that gives another partial response sequence that provides the closest Euclidean distance with respect to a partial response sequence obtained from a correct sequence. This sequence is obtained when, for example, in PRML having a target response of PR(1, 2, 2, 1), only a 1-bit error is contained.

In bit detection based on PRML, therefore, it can be considered that the performance of bit detection based on PRML depends on a magnitude of a difference between a Euclidean distance between a partial response sequence obtained from a correct bit sequence and a reproduction signal and a Euclidean distance between a partial response sequence of a bit sequence containing only a 1-bit error and the reproduction signal, that is, a SAM value (=difference metric).

And in the recording/reproducing apparatus of the present embodiment, a reproduction signal read from the recording medium is decoded (binarized) using the PRML decoding scheme, wherein, in particular, a difference between two difference metrics, rather than the above-described SAM value (difference metric) itself, is used as an index for evaluating a reproduction signal quality thereof.

FIG. 1 shows a structure of a main part of the recording/reproducing apparatus of the embodiment.

An optical disk 1 serving as a recording medium having information recorded thereon is rotated by a spindle motor 2 during recording/reproduction.

An optical head 3 (optical pickup) radiates laser beams output from laser diodes onto the optical disk 1 from an objective lens using a predetermined optical system. It further directs reflected light from the optical disk 1 to a photodetector through the predetermined optical system to obtain an electric signal corresponding to the amount of reflected light. It further performs operation processing on light-amount signals detected at the plurality of photodetectors to generate a reproduction signal sA (reproduction RF signal) of the recorded information and various servo error signals for tracking, focusing, etc.

During recording, a recording signal DL is fed to the optical head 3 from a recording signal generation unit 9. The recording signal DL is a signal for driving the laser diodes in the optical head 3, and the laser diodes are driven to emit light in accordance with the recording signal DL.

During recording, recording data to be recorded on the optical disk 1 is subjected to encoding processing such as, for example, RLL(1, 7) modulation by a recording data encoder 8, and a resulting encoded signal DR is fed to the recording signal generation unit 9. The recording signal generation unit 9 generates the recording signal DL serving as a laser driving signal in accordance with the encoded signal DR.

Incidentally, so-called write strategy settings such as pulse level, pulse width, and pulse edge timing as laser driving signals are specified as recording conditions from a controller 10. That is, the recording signal generation unit 9 has a function for setting an intensity at which laser beams are emitted, and a function for setting an illumination time/timing, and can adjust the recording signal DL as a laser driving signal to adjust recording conditions for the optical disk 1.

During reproduction, the reproduction signal sA read by the optical head 3 is fed to a reproduction clock generation/sampling 4. The reproduction clock generation/sampling 4 generates a reproduction clock CK synchronous with the reproduction signal sA using a PLL circuit, and further performs sampling of the reproduction signal sA to output a sampled signal (digital reproduction signal) DS. The reproduction clock CK is used for processing in a PRML decoder device 5, a reproduction data decoder 6, and an evaluation value operation unit 7.

The sampled signal DS is fed to the PRML decoder 5, and partial response equalization processing or Viterbi decoding processing is performed.

Decoded data (binary data string) obtained by the decoding processing in the PRML decoder 5 is fed to the reproduction data decoder 6, and is subjected to processing such as demodulation processing corresponding to RLL(1, 7) modulation or the like, error correction processing, and deinterleaving to thereby obtain demodulated reproduction data.

The evaluation value operation unit 7, the details of which will be described below, receives an input equalization error obtained in the processing process in the PRML decoder 5, and calculates an evaluation value as a difference between two difference metrics using an equalization error value. This evaluation value corresponds to a difference between two difference metrics (SAM), and will be described below as an evaluation value "dSAM".

The controller 10 serves as a control unit of the recording/reproducing apparatus to control individual units. Featured operations in this example include evaluation of the reproduction signal quality using the evaluation value (dSAM) obtained by the evaluation value operation unit 7, and performance of recording condition setting processing (write strategy setting) in accordance with a result of the evaluation.

Figure 2:
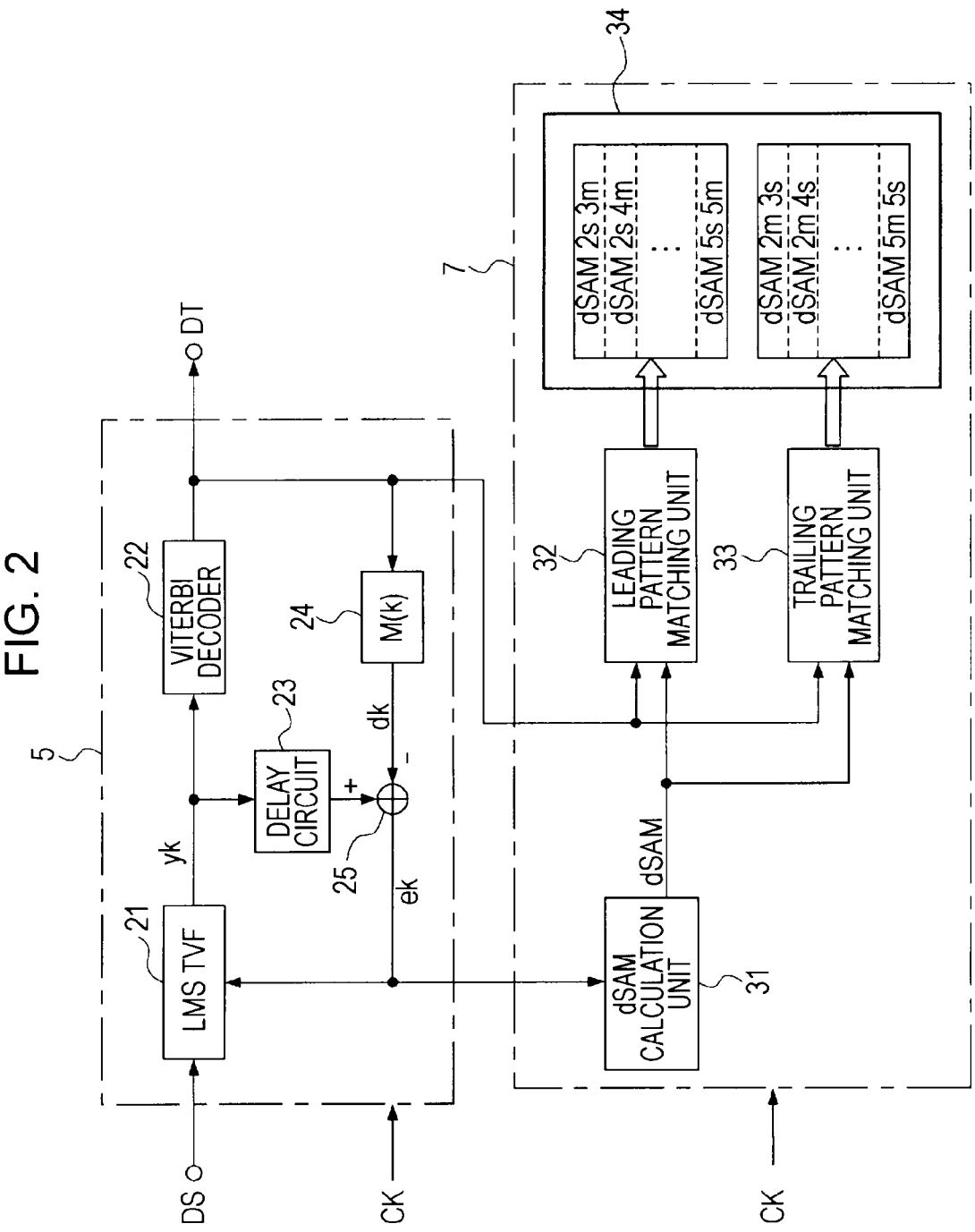
FIG. 2 is a block diagram of a PRML decoder and an evaluation value operation unit of the embodiment.

FIG. 2 shows a structure of the PRML decoder 5 and the evaluation value operation unit 7.

The PRML decoder 5 is provided with an equalizer for partial response equalization processing. In this example, the equalizer is implemented by a least-square (LMS) adaptive transversal filter (hereinafter, an LMS-TVF) 21.

An equalized signal yk that is equalized in the LMS-TVF 21 is fed to a Viterbi decoder 22 and a delay circuit 23.

The Viterbi decoder 22 performs the maximum likelihood decoding processing described above to obtain decoded data DT. That is, the Viterbi decoder 22 performs metric computation using the values existing in the outputs C0000 to C1111 described above as reference values, and performs maximum likelihood decoding.

In this example, since an adaptive equalizer (LMS-TVF 21) is used, a structure including the delay circuit 23, an expected value calculation unit 24, and an error arithmetic unit 25 is provided.

The LMS-TVF 21 is configured to update a filter coefficient from a difference between an output expected value obtained from a decoding result of the subsequent Viterbi decoder 22 and an equalized result, and to further equalize a signal to be input thereto.

To this end, the expected value calculation unit 24 calculates an original, expected equalized signal value based on the decoded data obtained by the Viterbi decoder 22. That is, an ideal value dk as the equalized signal value output from the LMS-TVF 21 is calculated from the decoding result. Incidentally, this ideal value may also be determined by convolution with a PR coefficient, or may be determined by calculating an output signal from a state transition. The latter is more suitable for supporting an arbitrary change in the equalization target value of the LMS-TVF 21, as described hereinafter.

The delay circuit 23 is provided in order to absorb an extra processing time in the Viterbi decoder 22 and the expected value calculation unit 24. That is, a timing at which the equalized signal yk and the corresponding ideal value dk are fed to the error arithmetic unit 25 is adjusted.

The error arithmetic unit 25 subtracts the ideal value dk from the equalized signal yk, and outputs the result as an equalization error ek.

The LMS-TVF 21 is configured to update a filter coefficient on the basis of the equalization error ek.

Incidentally, the equalization target value of the LMS-TVF 21 generally employs identification reference values (C0000 to C1111) in the Viterbi decoding. In some cases, however, the error rate may be better when values different from those values are set. To this end, a structure capable of separately setting an equalization target value of the LMS-TVF 21 is provided. In this case, identification reference values that can be changed are C0001, C1000 (both of which are assumed to have the same value), and C0110.

Note that C0111 and C1110 cause the value of C0001 to be changed to a symmetric value as viewed from C1100 and C0011. Similarly, C1001 causes C0110 to be changed to have a symmetric value as viewed from C1100 and C0011.

The evaluation value operation unit 7 is configured to have a dSAM calculation unit 31, a leading pattern matching unit 32, a trailing pattern matching unit 33, and a dSAM storage unit 34.

Figure 3:
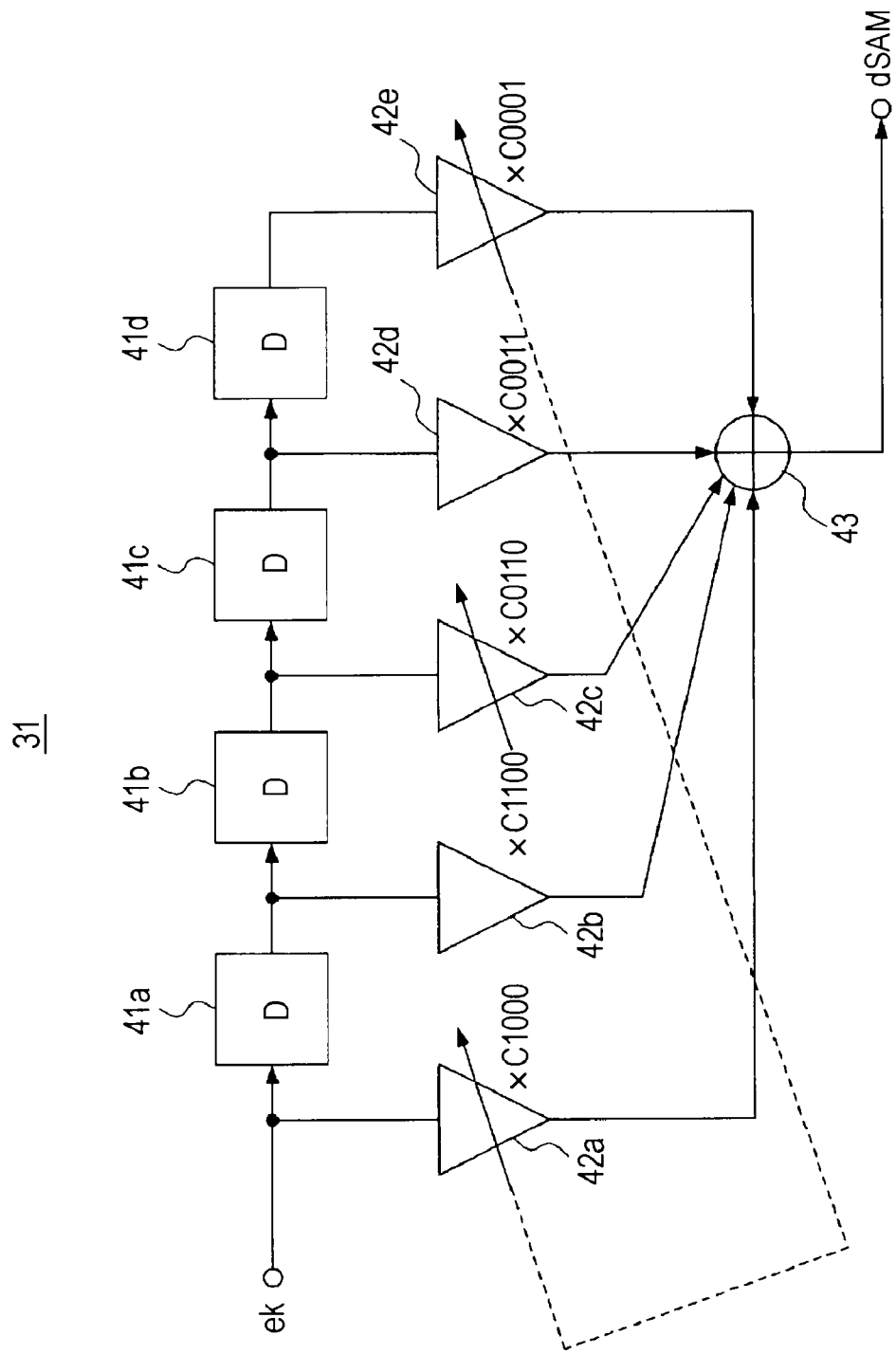
FIG. 3 is a block diagram of a structure of a dSAM calculation unit of the embodiment.

The dSAM calculation unit 31 calculates an evaluation value dSAM from the value of the equalization error ek described above. The dSAM calculation unit 31 is configured to have, as in FIG. 3, one-clock-timing delay circuits 41a to 41d, coefficient multipliers 42a to 42e, and an adder 43.

The coefficient multipliers 42a to 42e have coefficient values which are set to C1000, C1100, C0110, C0011, and C0001, respectively.

And adding, at the adder 43, the output values of the coefficient multipliers 42a to 42e yields an evaluation value dSAM.

As described above, the evaluation value dSAM is a difference between two difference metrics. That is, if it is assumed that a difference between a Euclidean distance between an equalized signal and a maximum likelihood path and a Euclidean distance between the equalized signal and a counter-path considered to be in a bit-advanced shift direction is a first difference metric and that a difference between a Euclidean distance between an equalized signal and a maximum likelihood path and a Euclidean distance between the equalized signal and a counter-path considered to be in a bit-delayed shift direction is a second difference metric, a difference between the first and second difference metrics is equal to the evaluation value dSAM, which corresponds to the value obtained by the dSAM calculation unit 31 of the structure of FIG. 3. The reason of this will be explained in detail below.

Incidentally, as described above, if C0001, C1000, and C0110 are changed as equalization target values of the LMS-TVF 21, the coefficients of the coefficient multipliers 42a and 42e as well as the coefficient multiplier 42c are also changed accordingly.

The evaluation value dSAM calculated by the dSAM calculation unit 31 is fed to the leading pattern matching unit 32 and the trailing pattern matching unit 33.

The leading pattern matching unit 32 identifies a pattern of a leading edge (space-to-mark transition pattern) of the decoded data in the Viterbi decoder 22, and stores the evaluation value dSAM in the dSAM storage unit 34 in a distinct manner according to each pattern.

The trailing pattern matching unit 33 identifies a pattern of a trailing edge (mark-to-space transition pattern) of the decoded data in the Viterbi decoder 22, and stores the evaluation value dSAM in the dSAM storage unit 34 in a distinct manner according to each pattern.

This allows the dSAM storage unit 34 to classify evaluation values dSAM by pattern and store them.

FIG. 7 shows an example of pattern matching.

Part (a) of FIG. 7 shows an example of grouping of patterns of leading edges. 2s denotes a space of 2T, 3s denotes a space of 3T, 4s denotes a space of 4T, and over 5s denotes a space of 5T or more. T is a channel clock period.

Further, 2m denotes a mark of 2T, 3m denotes a mark of 3T, 4m denotes a mark of 4T, and over 5m denotes a mark of 5T or more (5T to 8T). And, for example, XsYm means a leading-edge pattern of a transition from a space of XT to a mark of YT. For example, 2s3m is a pattern of a leading edge with a transition from a space of 2T to a mark of 3T. Further, 5s5m is a pattern of a leading edge with a transition from a space of 5T or more to a mark of 5T or more.

As in part (a) of FIG. 7, 2s3m, 2s4m, 2s5m, 3s2m, 3s3m, ... 5s5m are separately identified as patterns of leading edges.

The leading pattern matching unit 32 causes an evaluation value dSAM calculated at the occurrence of, for example, the pattern of 2s3m as a decoded data pattern in the Viterbi decoder 22 to be stored in the dSAM storage unit 34 as an evaluation value dSAM2s3m.

Further, an evaluation value dSAM calculated at the occurrence of the pattern of 2s4m is stored in the dSAM storage unit 34 as an evaluation value dSAM2s4m.

That is, when the leading-edge patterns of part (a) of FIG. 7 have occurred as decoded data, evaluation values dSAM are stored in a distinct manner according to them. Incidentally, an evaluation value dSAM obtained in the case of a pattern that is assumed not to require evaluation value measurement, such as the pattern of 2s2m, is not stored.

Part (b) of FIG. 7 shows an example of grouping of patterns of trailing edges. For example, XmYs means a pattern of a trailing edge with a transition from a mark of XT to a space of YT. For example, 2m3s is a pattern of a trailing edge with a transition from a mark of 2T to a space of 3T. Further, 5m5s is a pattern of a trailing edge with a transition from a mark of 5T or more to a space of 5T or more.

As in part (b) of FIG. 7, 2m3s, 2m4s, 2m5s, 3m2s, 3m3s, ... 5m5s are separately identified as patterns of trailing edges.

The trailing pattern matching unit 33 causes an evaluation value dSAM calculated at the occurrence of, for example, the pattern of 2m3s as a decoded data pattern in the Viterbi decoder 22 to be stored in the dSAM storage unit 34 as an evaluation value dSAM2m3s.

Further, an evaluation value dSAM calculated at the occurrence of the pattern of 2m4s is stored in the dSAM storage unit 34 as an evaluation value dSAM2m4s.

That is, when the trailing-edge patterns of part (b) of FIG. 7 have occurred as decoded data, evaluation values dSAM are stored in a distinct manner according to them. Incidentally, an evaluation value dSAM obtained in the case of a pattern that is assumed not to require evaluation value measurement, such as the pattern of 2m2s, is not stored.

The grouping of patterns as in FIG. 7 is an example. If the dSAM storage unit 34 has a sufficient capacity, for example, instead of collectively designating 5T to 8T as a set of 5T or more, 5T to 8T may be separately grouped into patterns and stored.

In addition, even for evaluation values dSAM with the same pattern, when each of them is obtained, the evaluation values dSAM may be additionally stored, or an added value may be stored.

For example, an evaluation value dSAM may be stored each time the pattern of 2s3m occurs, so that a plurality of evaluation values dSAM2s3m can be saved. Alternatively, in the case of the pattern of 2s3m, evaluation values may be accumulatively added so that an added value can be saved as a single evaluation value dSAM2s3m. Note that preferably, when an added value is stored, the value of the number of additions (that is, the number of occurrences of this pattern) is also stored.

In the recording/reproducing apparatus of the present embodiment, the evaluation value operation unit 7 calculates evaluation values dSAM in the manner described above, and groups them into, for example, patterns before storing them as evaluation values dSAM2s3m, . . . dSAM5m5s.

The controller 10, when performing, for example, write strategy adjustment as recording conditions, or the like, performs recording by variously changing the recording conditions and checks evaluation values dSAM obtained by reproducing them to identify optimum recording conditions. The adjustment of optimum recording conditions can be achieved.

The following explanation will be given with respect to the evaluation value dSAM used for such adjustment of recording conditions (write strategy adjustment) or the like.

As described earlier, particularly, in an optical disk recording/reproducing apparatus including a PRML reproducing system, a SAM value exists as an index for evaluating the signal quality (that is, here, the quality of a write signal in accordance with recording conditions as a write strategy). The evaluation value dSAM, as referred to in the present example, is an evaluation index serving as an extended SAM value and is defined as an index indicating in which direction of an advanced or delayed bit shift a reproduction waveform is shifted and indicating a shift amount.

As is already known, a SAM value refers to a difference between a Euclidean distance between a reproduction signal subjected to equalization processing (equalized signal) which is obtained by metric computation in Viterbi decoding and a decision path (maximum likelihood path) and a Euclidean distance between the equalized signal and a counter-path, and can be represented by (Math. 1) as follows:

$$SAM = \sum_k (y_k - d'_k)^2 - \sum_k (y_k - d_k)^2 \qquad [\text{Math. 1}]$$

Here, yk is a value equalized by the LMS-TVF 21, dk is an estimated output value of the decision path, and d'k is an estimated output value of the counter-path.

The counter-path originates from a location of a branch in a state transition. In terms of a recording waveform, recording may be performed for a short period or a long period. Because of this, as viewed in decoded data, bits seem to be shifted.

Figures 5, 6:
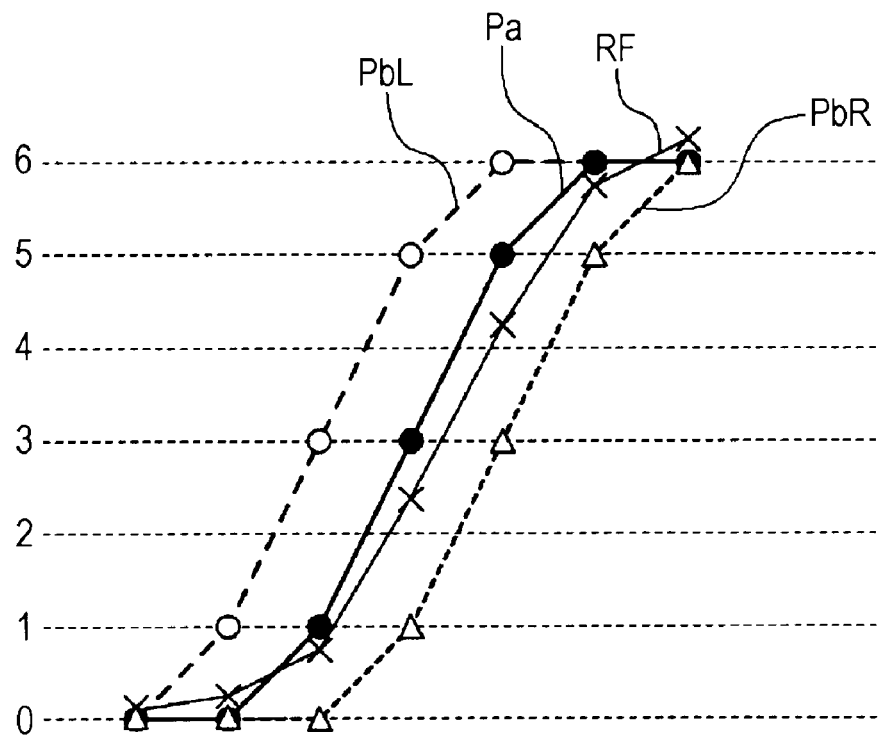
FIG. 5 is a diagram explaining a decision path and a counter-path.
FIG. 6 is a diagram explaining a bit shift.

For example, in FIG. 5, "RF" denotes an equalized signal sequence (that is, a sequence with the yk value), and "Pa" is a decision path for the equalized signal sequence RF (dk sequence). Further, in this case, "PbR" is a counter-path opposing the equalized signal sequence RF (d'k sequence).

As with (Math. 1) above, in this case, a difference between a Euclidean distance between the equalized signal sequence RF and the decision path Pa and a Euclidean distance between the equalized signal sequence RF and the counter-path PbR is a SAM value.

Opposing the decision path which is an original state transition the counter-path is a path that causes longer mark recording (bit-advanced shift) or shorter mark recording (bit-delayed shift).

For example, in FIG. 5, the counter-path PbR opposing the decision path Pa which is an original state transition is a path in which a bit shift in the delayed direction occurs.

That is, as viewed in the decoded data, the decision path Pa is bk (4T-space to 4T-mark) of FIG. 6 while the counter-path PbR is a decoded data sequence in which a 1-bit-delayed shift has occurred, like b'k (5T-space to 3T-mark) of FIG. 6. (Shaded portions are images of marks)

Further, in FIG. 5, when "PbL" is considered to be a counter-path, the counter-path PbL opposing the decision path Pa is a path in which a bit shift in the advanced direction occurs.

That is, as viewed in the decoded data, the decision path Pa is bk (4T-space to 4T-mark) of FIG. 6 while the counter-path PbL is a decoded data sequence in which a 1-bit-advanced shift has occurred, like b"k (3T-space to 5T-mark) of FIG. 6.

Accordingly, if a SAM value in consideration of a counter-path (d"k sequence) for a bit-advanced shift as opposing a decision path (dk sequence) that is an original state transition is denoted by SAM_lead and a SAM value in consideration of a counter-path (d'k sequence) for a bit-delayed shift as opposing the decision path (d'k sequence) is denoted by SAM_rag, then SAM_lead and SAM_rag are given by (Math. 2) and (Math. 3) as follows:

$$\text{SAM\_lead} = \sum_k (y_k - d_k'')^2 - \sum_k (y_k - d_k)^2 \quad [\text{Math. 2}]$$

$$\text{SAM\_rag} = \sum_k (y_k - d_k')^2 - \sum_k (y_k - d_k)^2 \quad [\text{Math. 3}]$$

And if it is to be determined in which direction in the advanced direction and the delayed direction a signal being recorded is being shifted, the magnitudes of (Math. 2) and (Math. 3) may be compared. That is, the value of (SAM_lead) minus (SAM_rag) may be determined. Then, if no bit shift has occurred, the value of (SAM_lead) minus (SAM_rag) is 0. If it is not 0, it can be determined whether the shift is delayed or advanced depending on whether the value is positive or negative. Further, the magnitude of this value also represents a shift amount indicating how much the shift is advanced or delayed.

In the present example, it is assumed that an evaluation value dSAM is given by this calculation, namely, (SAM_lead) minus (SAM_rag).

The evaluation value dSAM, given by (SAM_lead) minus (SAM_rag), that is, (Math. 2) minus (Math. 3), can be represented by (Math. 4) as follows:

$$dSAM = \sum_k (y_k - d_k'')^2 - \sum_k (y_k - d_k')^2 \quad [\text{Math. 4}]$$

Further, as explained in the structure of FIG. 2, if the equalization error ek is considered, then yk−dk=ek. Thus, (Math. 4) above can be represented by (Math. 5) as follows:

[Math. 5]

$$dSAM = \Sigma e_k^2 + 2\Sigma e_k(d_k - d''_k) + \Sigma(d_k - d''_k)^2 - \Sigma e_k^2 - 2\Sigma e_k(d_k - d'_k) - \Sigma(d_k - d'_k)^2$$

Here, the third term in (Math. 5) is the Euclidean distance measure on data with a 1-bit shift in the advanced direction, and the sixth term is the Euclidean distance measure on data with a 1-bit shift in the delayed direction, both of which have the same value. Therefore, the equation (Math. 5) can be represented only by the second and fifth terms, and can further be modified as given by (Math. 6).

$$dSAM = 2\sum_k e_k(d_k'' - d_k') \quad [\text{Math. 6}]$$

Here, the outputs d"k, d'k, and dk originally demonstrate a response relationship to the original bit data strings b"k, b'k, and bk. If an operation which means the response is represented by M(k) (where this operation is generally a convolution with PR polynomials), then $$dk = M(bk),$$

and therefore $$d''k - d'k = M(b''k - b'k).$$

Here, if b"k−b'k is a bit shift pattern Ek, then the following holds.
bk={0, 0, 0, 0, 0, 1, 1, 1, 1, x . . . }
b"k={0, 0, 0, 0, 1, 1, 1, 1, 1, x . . . }
b'k={0, 0, 0, 0, 0, 0, 1, 1, 1, x . . . }
Ek={0, 0, 0, 0, 1, 1, 0, 0, 0, x . . . }

If bk is "1" at time k, then Ek given by b"k−b'k is "1" only at time k−1 and time k.

From the foregoing, (Math. 6) above is represented by a sum of products of the output responses of Ek and the equivalent error ek. However, since Ek is "1" only at time k−1 and time k, M(Ek) is displayed by simple polynomials.

If, starting from time k−1, time k−1→time k→time k+1→time k+2 is considered, then as in the state transition diagram given in FIG. 4, the outputs of M(Ek) are:
C0001→C0011→C0110→C1100→C1000,
and C0000 is obtained otherwise. C0000 is equal to 0 without a response, and (Math. 6) is finally represented by:

[Math. 7]

$$dSAM = -2(C0001 \cdot e_{k-1} + C0011 \cdot e_{k+1} + C0110 \cdot e_{k+1} + C1100 \cdot e_{k+2} + C1000 \cdot e_{k+3})$$

The above equation is obtained.

Incidentally, (Math. 7) represents the case of a space-to-mark transition and the polarity of (Math. 7) is reversed in the case of a mark-to-space transition.

Eventually, the evaluation value dSAM can be considered as with (Math. 7). That is, for (Math. 7), it is understood that the evaluation value dSAM can be determined by performing an operation of C0001, C0011, C0110, C1100, and C1000 with respect to the equalization errors (ek−1, ek, ek+1, ek+2, ek+3) using the ratio of the identification reference values as a coefficient, wherein C0000=0, that is, the dSAM calculation unit 31 of the structure shown in FIG. 3 can determine this evaluation value dSAM.

In the present embodiment, therefore, an evaluation value dSAM as a difference between SAM values (difference metrics) is calculated. And, in particular, the evaluation value dSAM can be determined with a simple structure using an equalization error ek.

The evaluation value dSAM quantitatively represents a direction of a bit shift and a shift amount, and is thus very suitable for the evaluation of the recording quality. In particular, it is suitable as an index for write strategy adjustment.

Further, as explained in the structure of FIG. 2, the evaluation value dSAM is stored in a distinct manner according to each decoded data pattern, which is also useful for the evaluation of the setting of recording conditions.

Furthermore, it is possible to determine the evaluation value dSAM using a simple structure, which would lead to the advantage of simple hardware implementation.

While an embodiment has been explained, a variety of modifications of the present invention are conceivable.

The evaluation value operation unit 7 is configured to save evaluation values dSAM by classifying them according to the lengths of marks and spaces before and after edges. Alternatively, as a further extension of the detection of the states before and after patterns, the classification according to the mark lengths and space lengths of edges two edges before and after the current edge may be provided.

Further, while the foregoing examples have been described on the assumption of PR(1, x, x, 1), the present invention can be applied to any other partial response equalization scheme such as, for example, PR(1, 2, 1).

That is, the evaluation value dSAM given by (Math. 7) above is determined according to the situation in which, as described above, a pattern of 0, 0, 0, 0, 1, 1, 0, 0, 0, x . . . as a bit shift pattern Ek (=b"k−b'k) is obtained, which may be an identification response pattern of a 2T signal in an arbitrary partial response system. The evaluation value dSAM given by (Math. 7) above is therefore a sum of products of identification responses obtained by the arbitrary partial response system in response to the 2T signal and the equalization error ek. By applying such an evaluation value dSAM in various partial response equalization schemes, the advantages of the present invention can be achieved.

Further, the evaluation value operation unit 7 that generates the evaluation value dSAM is designed to be incorporated in the recording/reproducing apparatus. Alternatively, it may be constructed as a device external to the recording/reproducing apparatus and may be an independent evaluation apparatus used for the recording/reproducing apparatus.

Further, the present invention can also be applied as a recording/reproducing apparatus, an evaluation value operation apparatus, and an evaluation value operation method in a system for a recording medium other than an optical disk.

The invention claimed is:

1. A recording/reproducing apparatus characterized by comprising:
a writing/reading unit that writes and reads information represented by a mark and a space to and from a recording medium;
a PRML decoding unit that performs partial response equalization processing and maximum likelihood decoding processing on a reproduction signal read from the recording medium by the writing/reading unit to obtain decoded data; and
an evaluation value operation unit that calculates a signal quality evaluation value corresponding to a difference between a difference metric between a maximum likelihood path for an equalized signal that is fed to the maximum likelihood decoding processing through the partial response equalization processing and a path in a bit-advanced shift direction and a difference metric between the maximum likelihood path for the equalized signal and a path in a bit-delayed shift direction.

2. The recording/reproducing apparatus according to claim 1, characterized in that the evaluation value operation unit calculates the signal quality evaluation value using an equalization error value which is an error between an equalized signal value fed to the maximum likelihood decoding processing and an ideal equalized signal value determined from a decoded signal obtained as a result of the maximum likelihood decoding processing.

3. The recording/reproducing apparatus according to claim 1, characterized in that the evaluation value operation unit stores the calculated signal quality evaluation value in a distinct manner according to a decoded data pattern decoded in the maximum likelihood decoding processing.

4. The recording/reproducing apparatus according to claim 1, characterized by further comprising control means for performing adjustment of a recording signal for a writing operation in the writing/reading unit by using the evaluation value obtained by the evaluation value operation unit.

5. An evaluation value operation method for calculating a signal quality evaluation value when information represented by a mark and a space on a recording medium is read, the signal quality evaluation value being an index of a quality of the read signal, characterized by comprising:
when partial response equalization processing and maximum likelihood decoding processing are performed on a signal read from the recording medium to obtain decoded data,
calculating a signal quality evaluation value corresponding to a difference between a difference metric between a maximum likelihood path for an equalized signal that is fed to the maximum likelihood decoding processing through the partial response equalization processing and a path in a bit-advanced shift direction and a difference metric between the maximum likelihood path for the equalized signal and a path in a bit-delayed shift direction.

6. An evaluation value operation apparatus for calculating a signal quality evaluation value when information represented by a mark and a space on a recording medium is read, the signal quality evaluation value being an index of a quality of the read signal, characterized by comprising:
a calculation unit that calculates, on occasion of performing partial response equalization processing and maximum likelihood decoding processing on a signal read from the recording medium to obtain decoded data, a signal quality evaluation value corresponding to a difference between a difference metric between a maximum likelihood path for an equalized signal that is fed to the maximum likelihood decoding processing through the partial response equalization processing and a path in a bit-advanced shift direction and a difference metric between the maximum likelihood path for the equalized signal and a path in a bit-delayed shift direction.

* * * * *